(12) United States Patent
Robison et al.

(10) Patent No.: US 10,344,573 B2
(45) Date of Patent: Jul. 9, 2019

(54) POSITION SENSING FOR WELLSITE PUMPING UNIT

(71) Applicant: WEATHERFORD TECHNOLOGY HOLDINGS, LLC, Houston, TX (US)

(72) Inventors: Clark E. Robison, Tomball, TX (US); Peri Sabhapathy, Northville, MI (US); Benson Thomas, Pearland, TX (US)

(73) Assignee: Weatherford Technology Holdings, LLC, Houston, TX (US)

( * ) Notice: Subject to any disclaimer, the term of this patent is extended or adjusted under 35 U.S.C. 154(b) by 203 days.

(21) Appl. No.: 15/448,231

(22) Filed: Mar. 2, 2017

(65) Prior Publication Data

US 2017/0260836 A1 Sep. 14, 2017

Related U.S. Application Data

(60) Provisional application No. 62/305,321, filed on Mar. 8, 2016.

(51) Int. Cl.
*E21B 43/12* (2006.01)
*E21B 47/00* (2012.01)
(Continued)

(52) U.S. Cl.
CPC .......... *E21B 43/126* (2013.01); *E21B 43/129* (2013.01); *E21B 47/00* (2013.01);
(Continued)

(58) Field of Classification Search
CPC .............. F15B 15/2861; F15B 15/2846; E21B 43/126; E21B 43/121; E21B 43/129; G01D 5/145; G01B 7/003
See application file for complete search history.

(56) References Cited

U.S. PATENT DOCUMENTS 3,212,406 A 10/1965 McDuffie
3,269,320 A 8/1966 Tilley et al.
(Continued)

FOREIGN PATENT DOCUMENTS

CA 1193345 A 9/1985
CA 2288479 A 5/2001
(Continued)

OTHER PUBLICATIONS

Office Action dated Sep. 8, 2017 for U.S. Appl. No. 14/947,839, 41 pages.
(Continued)

*Primary Examiner* — Kipp C Wallace
(74) *Attorney, Agent, or Firm* — Smith IP Services, P.C.

(57) ABSTRACT

A hydraulic pumping system for use with a subterranean well can include an actuator with a displaceable actuator member, a magnet device that displaces with the actuator member, the magnet device including at least one permanent magnet positioned between low magnetic permeability elements, and a sensor that senses a magnetic flux propagated from the magnet device. The actuator can include a cylinder, and the sensor can include an outer tube, with materials of the cylinder and outer tube having substantially a same magnetic permeability. An enclosure can be positioned exterior to the cylinder, with the sensor being positioned at least partially in the enclosure. The enclosure can be configured to focus the magnet flux, so that it propagates to the sensor.

9 Claims, 8 Drawing Sheets

(51) Int. Cl.
 *F04B 47/02*  (2006.01)
 *F04B 47/04*  (2006.01)
 *F04B 49/06*  (2006.01)
 *F04B 49/10*  (2006.01)
 *F04B 53/16*  (2006.01)
 *G01D 5/14*  (2006.01)

(52) U.S. Cl.
 CPC ........ *E21B 47/0008* (2013.01); *F04B 47/026* (2013.01); *F04B 47/04* (2013.01); *F04B 49/06* (2013.01); *F04B 49/065* (2013.01); *F04B 49/10* (2013.01); *F04B 53/162* (2013.01); *G01D 5/145* (2013.01)

(56) References Cited

U.S. PATENT DOCUMENTS

| | | | |
|---|---|---|---|
| 3,635,081 A | | 1/1972 | Gibbs |
| 3,696,675 A | | 10/1972 | Gilmour |
| 3,889,220 A | | 6/1975 | Spodig |
| 4,392,792 A | | 7/1983 | Rogers |
| 4,471,304 A | | 9/1984 | Wolf |
| 4,480,685 A | | 11/1984 | Gilbertson |
| 4,546,607 A | | 10/1985 | Kime |
| 4,556,886 A | * | 12/1985 | Shimizu ................. G01D 5/243 324/166 |
| 4,662,177 A | | 5/1987 | David |
| 4,691,511 A | | 9/1987 | Dollison |
| 4,707,993 A | | 11/1987 | Kime |
| 4,717,874 A | * | 1/1988 | Ichikawa ......... B60G 17/01933 324/207.11 |
| 4,736,674 A | | 4/1988 | Stoll |
| 4,793,241 A | * | 12/1988 | Mano ..................... F02B 77/087 246/249 |
| 4,846,048 A | | 7/1989 | Hvilsted et al. |
| 4,879,555 A | * | 11/1989 | Ichikawa ............ F15B 15/2846 341/13 |
| 5,209,495 A | | 5/1993 | Palmour |
| 5,260,651 A | * | 11/1993 | Tischer ............ B60G 17/01933 324/207.16 |
| 5,281,100 A | | 1/1994 | Diederich |
| 5,431,230 A | | 7/1995 | Land et al. |
| 5,481,873 A | | 1/1996 | Saruwatari et al. |
| 5,514,961 A | * | 5/1996 | Stoll ..................... F15B 15/2807 324/207.13 |
| 5,717,330 A | * | 2/1998 | Moreau ..................... G01B 7/003 324/207.13 |
| 5,996,688 A | | 12/1999 | Schultz et al. |
| 6,310,472 B1 | | 10/2001 | Chass |
| 6,789,458 B2 | | 9/2004 | Schumacher et al. |
| 6,800,966 B2 | * | 10/2004 | Godkin ................ H02K 41/031 310/12.25 |
| 6,817,252 B2 | | 11/2004 | Wiklund et al. |
| 6,919,719 B2 | | 7/2005 | Reininger |
| 7,259,553 B2 | * | 8/2007 | Arns, Jr. ............. F15B 15/2846 324/207.25 |
| 7,263,781 B2 | | 9/2007 | Sielemann |
| 8,066,496 B2 | | 11/2011 | Brown |
| 8,083,499 B1 | | 12/2011 | Krug et al. |
| 8,156,953 B2 | | 4/2012 | Tveita |
| 8,336,613 B2 | | 12/2012 | Ramsey et al. |
| 8,444,393 B2 | | 5/2013 | Beck et al. |
| 8,523,533 B1 | | 9/2013 | Best |
| 8,613,317 B2 | | 12/2013 | Briquet et al. |
| 8,829,893 B2 | * | 9/2014 | Youngner ............... G01D 5/145 324/202 |
| 8,851,860 B1 | | 10/2014 | Mail |
| 9,062,694 B2 | * | 6/2015 | Fletcher .............. F15B 15/2861 |
| 9,115,705 B2 | | 8/2015 | Best |
| 9,429,001 B2 | | 8/2016 | Best |
| 9,479,031 B2 | * | 10/2016 | Beste ..................... G01D 5/485 |
| 9,745,975 B2 | | 8/2017 | Dancek |
| 2002/0157531 A1 | * | 10/2002 | Kadlicko ............ F15B 15/1457 92/5 R |
| 2004/0062657 A1 | | 4/2004 | Beck et al. |
| 2004/0226183 A1 | | 11/2004 | Sielemann |
| 2005/0142012 A1 | | 6/2005 | Padgett et al. |
| 2008/0118382 A1 | | 5/2008 | Ramsey et al. |
| 2009/0194291 A1 | | 8/2009 | Fesi et al. |
| 2009/0278641 A1 | * | 11/2009 | Hedayat .............. F15B 15/2861 335/284 |
| 2010/0107869 A1 | | 5/2010 | Fitzkee et al. |
| 2012/0315155 A1 | | 12/2012 | Rogers et al. |
| 2013/0043037 A1 | | 2/2013 | Ramsey et al. |
| 2013/0151216 A1 | | 6/2013 | Palka et al. |
| 2014/0079560 A1 | | 3/2014 | Hodges et al. |
| 2014/0102796 A1 | | 4/2014 | Veneruso et al. |
| 2014/0231093 A1 | * | 8/2014 | Hoell .................... E21B 43/121 166/372 |
| 2014/0262234 A1 | | 9/2014 | Walton et al. |
| 2014/0294603 A1 | | 10/2014 | Best |
| 2014/0328664 A1 | | 11/2014 | Hearn |
| 2015/0078926 A1 | | 3/2015 | Krug et al. |
| 2015/0285041 A1 | | 10/2015 | Dancek |
| 2015/0285243 A1 | | 10/2015 | Adeleye |
| 2015/0308420 A1 | | 10/2015 | Donnally et al. |
| 2016/0177982 A1 | | 6/2016 | Kobayashi |
| 2016/0222995 A1 | | 8/2016 | Zientara |

FOREIGN PATENT DOCUMENTS

| | | | |
|---|---|---|---|
| CA | 2288479 | A1 | 5/2001 |
| CA | 2436924 | A1 | 2/2004 |
| CA | 2515616 | A1 | 2/2006 |
| CA | 2826593 | A1 | 3/2014 |
| WO | 9508860 | A1 | 3/1995 |
| WO | 2009097338 | A2 | 8/2009 |
| WO | 2013063591 | A2 | 5/2013 |

OTHER PUBLICATIONS

Office Action dated Sep. 8, 2017 for U.S. Appl. No. 14/991,253, 47 pages.
Hua, C.; "Sucker Rod String Design of the Pumping Systems", Indenieria E Investigacion vol. 35, dated Aug. 2, 2015, 9 pages.
Specification and Drawings for International Patent Application No. PCT/US15/43694, filed Aug. 5, 2015, 54 pages.
Omega; "Transit-Time Ultrasonic Flow Meter", FDT-30 Series, 2 pages.
Rota Engineering LTD.; "Linear Transducers", mobile brochure MIM1-(1-9)-r4, 9 pages.
"Multi Parameter Gas Mass Flowmeters", FMA6600 Series, 3 pages.
"Ultrasonic Level Transmitter and Controller", LVCN210 Series, 1 page.
"Compact Ultrasonic Solid State Liquid Level Switch", LVSW-710/LVSW-720, 1 page.
Papailias Incorporated; "Rectangular Sightglasses Series RS", company brochure, 1 page.
Sultan; "Quickstart", product guide, dated Jan. 2011, 16 pages.
Weatherford; "WellPilot Rod Pump Optimization Controller", article No. 6230.01, dated 2010-2012, 4 pages.
T.A. Everitt, et al.; "An Improved Finite-Difference Calculation of Downhole Dynamometer Cards for Sucker-Rod Pumps", SPE18189, dated Feb. 1992, 7 pages.
Specification and Drawings for U.S. Appl. No. 14/991,253, filed Jan. 8, 2016, 49 pages.
International Search Report with Written Opinion dated Jan. 20, 2016 for PCT Patent Application No. PCT/US15/43694, 13 pages.
Smalley; "Laminar Seal Rings", company article, pp. 103-109, 7 pages.
Weatherford; RamPump, company brochure 800.03, dated 2005-2006, 4 pages.
Weatherford; "Nitrogen Over Hydraulic Pumping Unit", company presentation, 20 pages.
Specification and Drawings for U.S. Appl. No. 14/947,839, filed Nov. 20, 2015, 44 pages.

(56) References Cited

OTHER PUBLICATIONS

European Examination Report dated Jul. 17, 2018 for EP Patent Application No. 16 199 697.0, 5 pages.
European Examination Report dated Jul. 17, 2018 for EP Patent Application No. 16 199 698.8, 5 pages.
European Search Report dated Feb. 17, 2017 for EP Patent Application No. 16199698.8, 6 pages.
European Search Report dated May 2, 2017 for EP Patent Application No. 16183114.4, 14 pages.
T.A. Everitt et al; "An Improved Finite-Difference Calculation of Downhole Dynamometer Cards for Sucker-Rod Pumps", SPE Production Engineering, vol. 7, No. 01, dated Feb. 1, 1992, 7 pages.
European Search Report dated May 4, 2017 for EP Patent Application No. 16199697.0, 7 pages.
International Search Report with Written Opinion dated May 25, 2017 for PCT Patent Application No. PCT/US2017/020478, 16 pages.
Canadian Office Action dated Jun. 15, 2017 for CA Patent Application No. 2,936,221, 5 pages.
Canadian Office Action dated Jun. 16, 2017 for CA Patent Application No. 2,936,220, 6 pages.
Canadian Office Action dated Jun. 19, 2017 for CA Patent Application No. 2,936,322, 5 pages.
Canadian Office Action dated Jun. 21, 2017 for CA Patent Application No. 2,936,302, 5 pages.
Canadian Office Action dated Jul. 4, 2017 for CA Patent Application No. 2,936,320, 6 pages.
European Examination Report dated Oct. 19, 2018 for EP Patent Application No. 16 183 105.2, 5 pages.
European Examination Report dated Oct. 19, 2018 for EP Patent Application No. 16 183 114.4, 5 pages.
European Examination Report dated Oct. 19, 2018 for EP Patent Application No. 16 183 126.8, 6 pages.
Office Action dated Oct. 3, 2018 for U.S. Appl. No. 14/991,253, 74 pages.
Office Action dated Oct. 4, 2018 for U.S. Appl. No. 14/947,839, 37 pages.
Office Action dated Jan. 25, 2018 for U.S. Appl. No. 14/947,839, 49 pages.
Office Action dated Jan. 26, 2018 for U.S. Appl. No. 14/991,253, 55 pages.
Office Action dated Feb. 23, 2018 for U.S. Appl. No. 14/956,545, 46 pages.
Office Action dated May 11, 2018 for U.S. Appl. No. 14/991,253, 51 pages.
Office Action dated Aug. 23, 2018 for U.S. Appl. No. 14/956,527, 24 pages.
Office Action dated Sep. 7, 2018 for U.S. Appl. No. 14/956,545, 26 pages.

\* cited by examiner

POSITION SENSING FOR WELLSITE PUMPING UNIT

CROSS-REFERENCE TO RELATED APPLICATION

This application claims the benefit of the filing date of prior U.S. provisional application Ser. No. 62/305,321, filed on 8 Mar. 2016. The entire disclosure of this prior application is incorporated herein by this reference in its entirety.

BACKGROUND

It can be beneficial to be able to determine a position of an actuator member while an actuator is operating. Such position information can be used to evaluate the actuator's efficiency or other performance characteristics, to optimize an operation performed by the actuator, to determine characteristics of an environment or system in which the actuator operates, etc.

Therefore, it will be appreciated the improvements are continually needed in the art of position sensing for actuators. Such improvements can be useful in wellsite pumping operations, and in other well operations.

DETAILED DESCRIPTION

Figure 1:
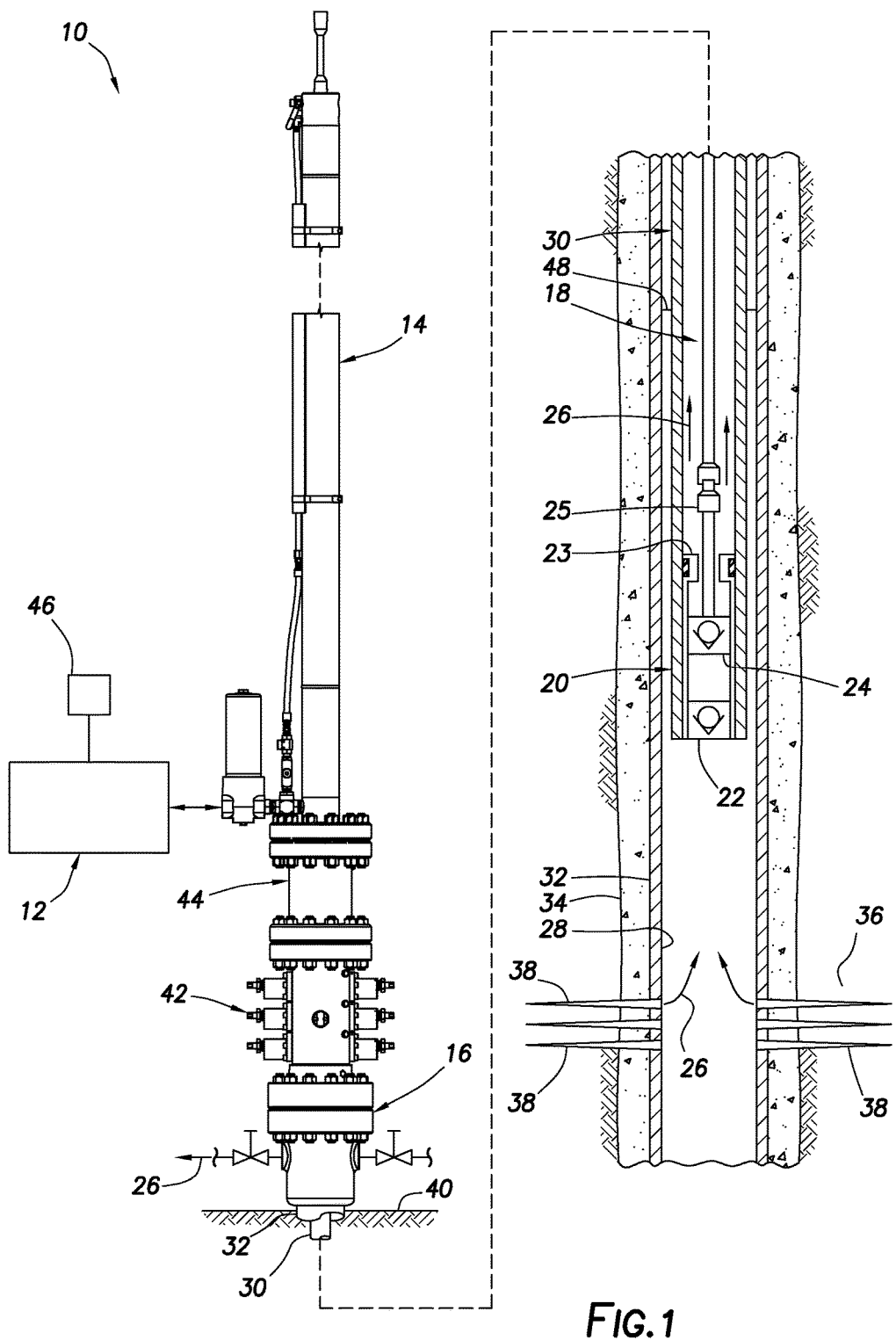
FIG. 1 is a representative partially cross-sectional view of an example of a hydraulic pumping system and associated method as used with a subterranean well, the system and method embodying principles of this disclosure.

Representatively illustrated in FIG. 1 is a hydraulic pumping system 10 and associated method for use with a subterranean well, which system and method can embody principles of this disclosure. However, it should be clearly understood that the hydraulic pumping system 10 and method are merely one example of an application of the principles of this disclosure in practice, and a wide variety of other examples are possible. Therefore, the scope of this disclosure is not limited at all to the details of the system 10 and method as described herein or depicted in the drawings.

In the FIG. 1 example, a hydraulic pressure source 12 is used to apply hydraulic pressure to, and exchange hydraulic fluid with, a hydraulic actuator 14 mounted on a wellhead 16. In response, the hydraulic actuator 14 reciprocates a rod string 18 extending into the well, thereby operating a downhole pump 20.

The rod string 18 may be made up of individual sucker rods connected to each other, although other types of rods or tubes may be used, the rod string 18 may be continuous or segmented, a material of the rod string 18 may comprise steel, composites or other materials, and elements other than rods may be included in the string. Thus, the scope of this disclosure is not limited to use of any particular type of rod string, or to use of a rod string at all. It is within the scope of this disclosure to use any structure capable of communicating reciprocating motion to the downhole pump 20.

The downhole pump 20 is depicted in FIG. 1 as being of the type having a stationary or "standing" valve 22 and a reciprocating or "traveling" valve 24. The traveling valve 24 is connected to, and reciprocates with, the rod string 18, so that fluid 26 is pumped from a wellbore 28 into a production tubing string 30. However, it should be clearly understood that the downhole pump 20 is merely one example of a wide variety of different types of pumps that may be used with the hydraulic pumping system 10 and method of FIG. 1, and so the scope of this disclosure is not limited to any of the details of the downhole pump described herein or depicted in the drawings.

The wellbore 28 is depicted in FIG. 1 as being generally vertical, and as being lined with casing 32 and cement 34. In other examples, a section of the wellbore 28 in which the pump 20 is disposed may be generally horizontal or otherwise inclined at any angle relative to vertical, and the wellbore section may not be cased or may not be cemented. Thus, the scope of this disclosure is not limited to use of the hydraulic pumping system 10 and method with any particular wellbore configuration.

In the FIG. 1 example, the fluid 26 originates from an earth formation 36 penetrated by the wellbore 28. The fluid 26 flows into the wellbore 28 via perforations 38 extending through the casing 32 and cement 34. The fluid 26 can be a liquid, such as oil, gas condensate, water, etc. However, the scope of this disclosure is not limited to use of the hydraulic pumping system 10 and method with any particular type of fluid, or to any particular origin of the fluid.

As depicted in FIG. 1, the casing 32 and the production tubing string 30 extend upward to the wellhead 16 at or near the earth's surface 40 (such as, at a land-based wellsite, a subsea production facility, a floating rig, etc.). The production tubing string 30 can be hung off in the wellhead 16, for example, using a tubing hanger (not shown). Although only a single string of the casing 32 is illustrated in FIG. 1 for clarity, in practice multiple casing strings and optionally one or more liner strings may be installed in the well (a liner string being a pipe that extends from a selected depth in the wellbore 28 to a shallower depth, typically sealingly "hung off" inside another pipe or casing).

In the FIG. 1 example, a rod blowout preventer stack 42 and an annular seal housing 44 are connected between the hydraulic actuator 14 and the wellhead 16. The rod blowout preventer stack 42 includes various types of blowout preventers (BOP's) configured for use with the rod string 18. For example, one blowout preventer can prevent flow through the blowout preventer stack 42 when the rod string 18 is not present therein, and another blowout preventer can prevent flow through the blowout preventer stack 42 when the rod string 18 is present therein. However, the scope of this disclosure is not limited to use of any particular type or configuration of blowout preventer stack with the hydraulic pumping system 10 and method of FIG. 1.

Figure 2:
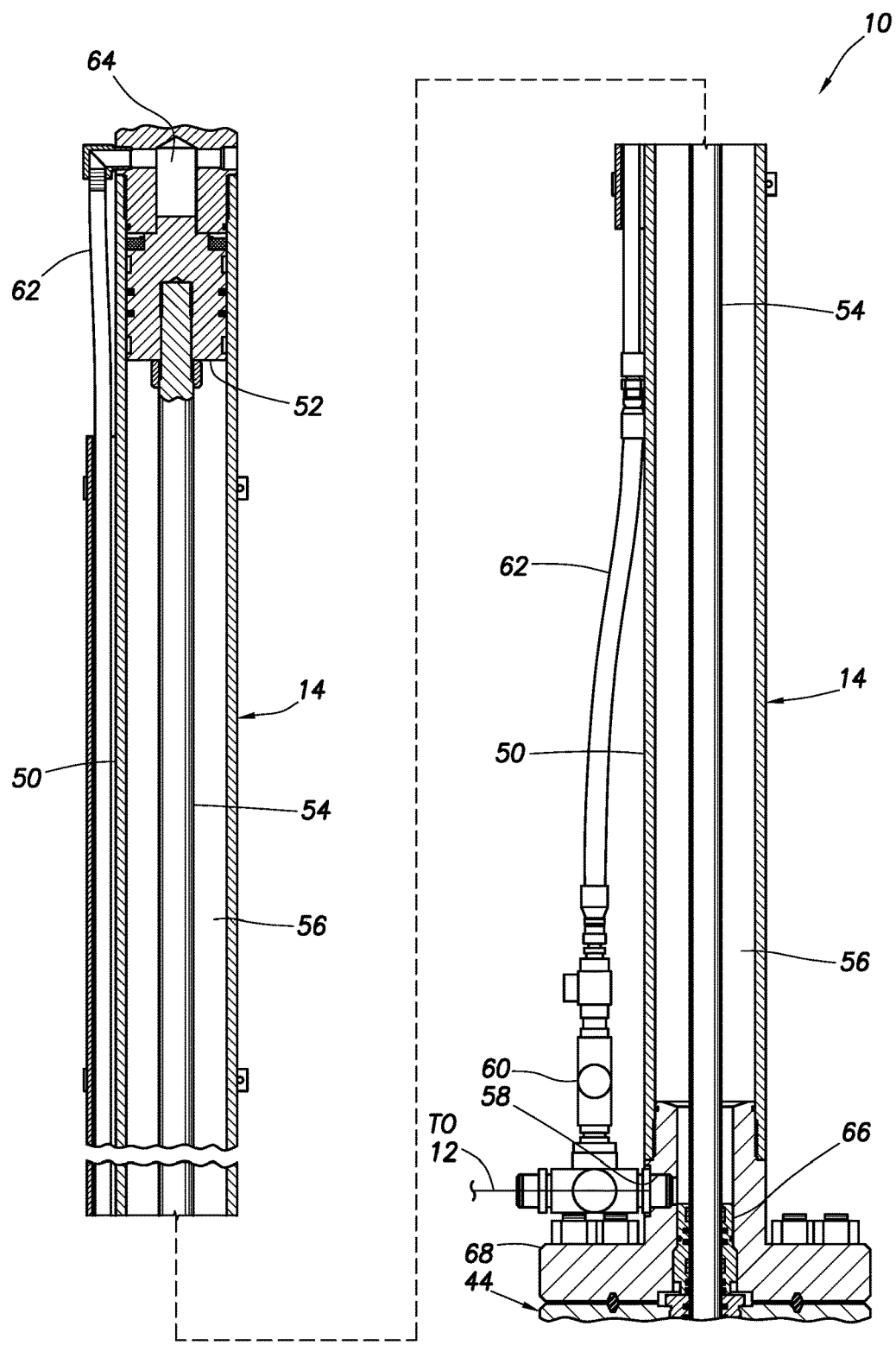
FIG. 2 is a representative partially cross-sectional view of an example of a hydraulic actuator as used in the hydraulic pumping system and method, the hydraulic actuator embodying the principles of this disclosure.

The annular seal housing 44 includes an annular seal about a piston rod of the hydraulic actuator 14 (not visible in FIG. 1, see FIG. 2). The piston rod connects to the rod string 18 below the annular seal, although in other examples a connection between the piston rod and the rod string 18 may be otherwise positioned.

The hydraulic pressure source 12 may be connected directly to the hydraulic actuator 14, or it may be positioned remotely from the hydraulic actuator 14 and connected with, for example, suitable hydraulic hoses or pipes. Operation of the hydraulic pressure source 12 is controlled by a control system 46.

The control system 46 may allow for manual or automatic operation of the hydraulic pressure source 12, based on operator inputs and measurements taken by various sensors. The control system 46 may be separate from, or incorporated into, the hydraulic pressure source 12. In one example, at least part of the control system 46 could be remotely located or web-based, with two-way communication between the hydraulic pressure source 12 and the control system 46 being via, for example, satellite, wireless or wired transmission.

The control system 46 can include various components, such as a programmable controller, input devices (e.g., a keyboard, a touchpad, a data port, etc.), output devices (e.g., a monitor, a printer, a recorder, a data port, indicator lights, alert or alarm devices, etc.), a processor, software (e.g., an automation program, customized programs or routines, etc.) or any other components suitable for use in controlling operation of the hydraulic pressure source 12. The scope of this disclosure is not limited to any particular type or configuration of a control system.

In operation of the hydraulic pumping system 10 of FIG. 1, the control system 46 causes the hydraulic pressure source 12 to increase pressure applied to the hydraulic actuator 14 (delivering a volume of hydraulic fluid into the hydraulic actuator), in order to raise the rod string 18. Conversely, the hydraulic pressure source 12 receives a volume of hydraulic fluid from the hydraulic actuator 14 (thereby decreasing pressure applied to the hydraulic actuator), in order to allow the rod string 18 to descend. Thus, by alternately increasing and decreasing pressure in the hydraulic actuator 14, the rod string 18 is reciprocated, the downhole pump 20 is actuated and the fluid 26 is pumped out of the well.

Note that, in this example, when pressure in the hydraulic actuator 14 is decreased to allow the rod string 18 to displace downward (as viewed in FIG. 1), the pressure is not decreased to zero gauge pressure (e.g., atmospheric pressure). Instead, a "balance" pressure is maintained in the hydraulic actuator 14 to nominally offset a load due to the rod string 18 being suspended in the well (e.g., a weight of the rod string, taking account of buoyancy, inclination of the wellbore 28, friction, well pressure, etc.).

In this manner, the hydraulic pressure source 12 is not required to increase pressure in the hydraulic actuator 14 from zero to that necessary to displace the rod string 18 upward (along with the displaced fluid 26), and then reduce the pressure back to zero, for each reciprocation of the rod string 18. Instead, the hydraulic pressure source 12 only has to increase pressure in the hydraulic actuator 14 sufficiently greater than the balance pressure to displace the rod string 18 to its upper stroke extent, and then reduce the pressure in the hydraulic actuator 14 back to the balance pressure to allow the rod string 18 to displace back to its lower stroke extent.

Note that it is not necessary for the balance pressure in the hydraulic actuator 14 to exactly offset the load exerted by the rod string 18. In some examples, it may be advantageous for the balance pressure to be somewhat less than that needed to offset the load exerted by the rod string 18. In addition, it can be advantageous in some examples for the balance pressure to change over time. Thus, the scope of this disclosure is not limited to use of any particular or fixed balance pressure, or to any particular relationship between the balance pressure, any other force or pressure and/or time.

A reciprocation speed of the rod string 18 will affect a flow rate of the fluid 26. Generally speaking, the faster the reciprocation speed at a given length of stroke of the rod string 18, the greater the flow rate of the fluid 26 from the well (to a point).

It can be advantageous to control the reciprocation speed, instead of reciprocating the rod string 18 as fast as possible. For example, a fluid interface 48 in the wellbore 28 can be affected by the flow rate of the fluid 26 from the well. The fluid interface 48 could be an interface between oil and water, gas and water, gas and gas condensate, gas and oil, steam and water, or any other fluids or combination of fluids.

If the flow rate is too great, the fluid interface 48 may descend in the wellbore 28, so that eventually the pump 20 will no longer be able to pump the fluid 26 (a condition known to those skilled in the art as "pump-off"). On the other hand, it is typically desirable for the flow rate of the fluid 26 to be at a maximum level that does not result in pump-off. In addition, a desired flow rate of the fluid 26 may change over time (for example, due to depletion of a reservoir, changed offset well conditions, water or steam flooding characteristics, etc.).

A "gas-locked" downhole pump 20 can result from a pump-off condition, whereby gas is received into the downhole pump 20. The gas is alternately expanded and compressed in the downhole pump 20 as the traveling valve 24 reciprocates, but the fluid 26 cannot flow into the downhole pump 20, due to the gas therein.

In the FIG. 1 hydraulic pumping system 10 and method, the control system 46 can automatically control operation of the hydraulic pressure source 12 to regulate the reciprocation speed, so that pump-off is avoided, while achieving any of various desirable objectives. Those objectives may include maximum flow rate of the fluid 26, optimized rate of electrical power consumption, reduction of peak electrical loading, etc. However, it should be clearly understood that the scope of this disclosure is not limited to pursuing or achieving any particular objective or combination of objectives via automatic reciprocation speed regulation by the control system 46.

As mentioned above, the hydraulic pressure source 12 controls pressure in the hydraulic actuator 14, so that the rod string 18 is displaced alternately to its upper and lower stroke extents. These extents do not necessarily correspond to maximum possible upper and lower displacement limits of the rod string 18 or the pump 20.

For example, it is typically undesirable for a valve rod bushing 25 above the traveling valve 24 to impact a valve rod guide 23 above the standing valve 22 when the rod string 18 displaces downward (a condition known to those skilled in the art as "pump-pound"). Thus, it is preferred that the rod string 18 be downwardly displaced only until the valve rod bushing 25 is near its maximum possible lower displacement limit, so that it does not impact the valve rod guide 23.

On the other hand, the longer the stroke distance (without impact), the greater the productivity and efficiency of the pumping operation (within practical limits), and the greater the compression of fluid between the standing and traveling valves 22, 24 (e.g., to avoid gas-lock). In addition, a desired stroke of the rod string 18 may change over time (for example, due to gradual lengthening of the rod string 18 as a result of lowering of a liquid level (such as at fluid interface 48) in the well, etc.).

In the FIG. 1 hydraulic pumping system 10 and method, the control system 46 can automatically control operation of the hydraulic pressure source 12 to regulate the upper and lower stroke extents of the rod string 18, so that pump-pound is avoided, while achieving any of various desirable objectives. Those objectives may include maximizing rod string stroke length, maximizing production, minimizing electrical power consumption rate, minimizing peak electrical loading, etc. However, it should be clearly understood that the scope of this disclosure is not limited to pursuing or achieving any particular objective or combination of objectives via automatic stroke extent regulation by the control system 46.

Referring additionally now to FIG. 2, an enlarged scale cross-sectional view of an example of the hydraulic actuator 14 as used in the hydraulic pumping system 10 is representatively illustrated. Note that the hydraulic actuator 14 of FIG. 2 may be used with other systems and methods, in keeping with the principles of this disclosure.

As depicted in FIG. 2, the hydraulic actuator 14 includes a generally tubular cylinder 50, a piston 52 sealingly and reciprocably disposed in the cylinder 50, and a piston rod 54 connected to the piston 52. The piston 52 and piston rod 54 displace relative to the cylinder 50 in response to a pressure differential applied across the piston 52.

Hydraulic fluid and pressure are communicated between the hydraulic pressure source 12 and an annular chamber 56 in the cylinder 50 below the piston 52 via a port 58. A vent valve 60 is connected via a tubing 62 to an upper chamber 64 above the piston 52. The upper chamber 64 is maintained at substantially atmospheric pressure (zero gauge pressure), and pressure in the annular chamber 56 is controlled by the hydraulic pressure source 12, in order to control displacement of the piston 52 and piston rod 54 (and the rod string 18 connected thereto).

Note that, in this example, an annular seal assembly 66 is sealingly received in a lower flange 68 of the hydraulic actuator 14. The annular seal assembly 66 also sealingly engages an outer surface of the piston rod 54. Thus, a lower end of the annular chamber 56 is sealed off by the annular seal assembly 66.

In FIG. 2, the piston 52 is at a maximum possible upper limit of displacement. However, during a pumping operation, the piston 52 may not be displaced to this maximum possible upper limit of displacement. For example, as discussed above, an upper stroke extent of the rod string 18 may be regulated to achieve various objectives.

Similarly, during a pumping operation, the piston 52 also may not be displaced to a maximum possible lower limit of displacement. As described more fully below, upper and lower extents of displacement of the piston 52 and rod 54 can be varied to produce corresponding changes in the upper and lower stroke extents of the rod string 18, in order to achieve various objectives (such as, preventing pump-off, preventing pump-pound, optimizing pumping efficiency, reducing peak electrical loading, etc.).

Figure 3:
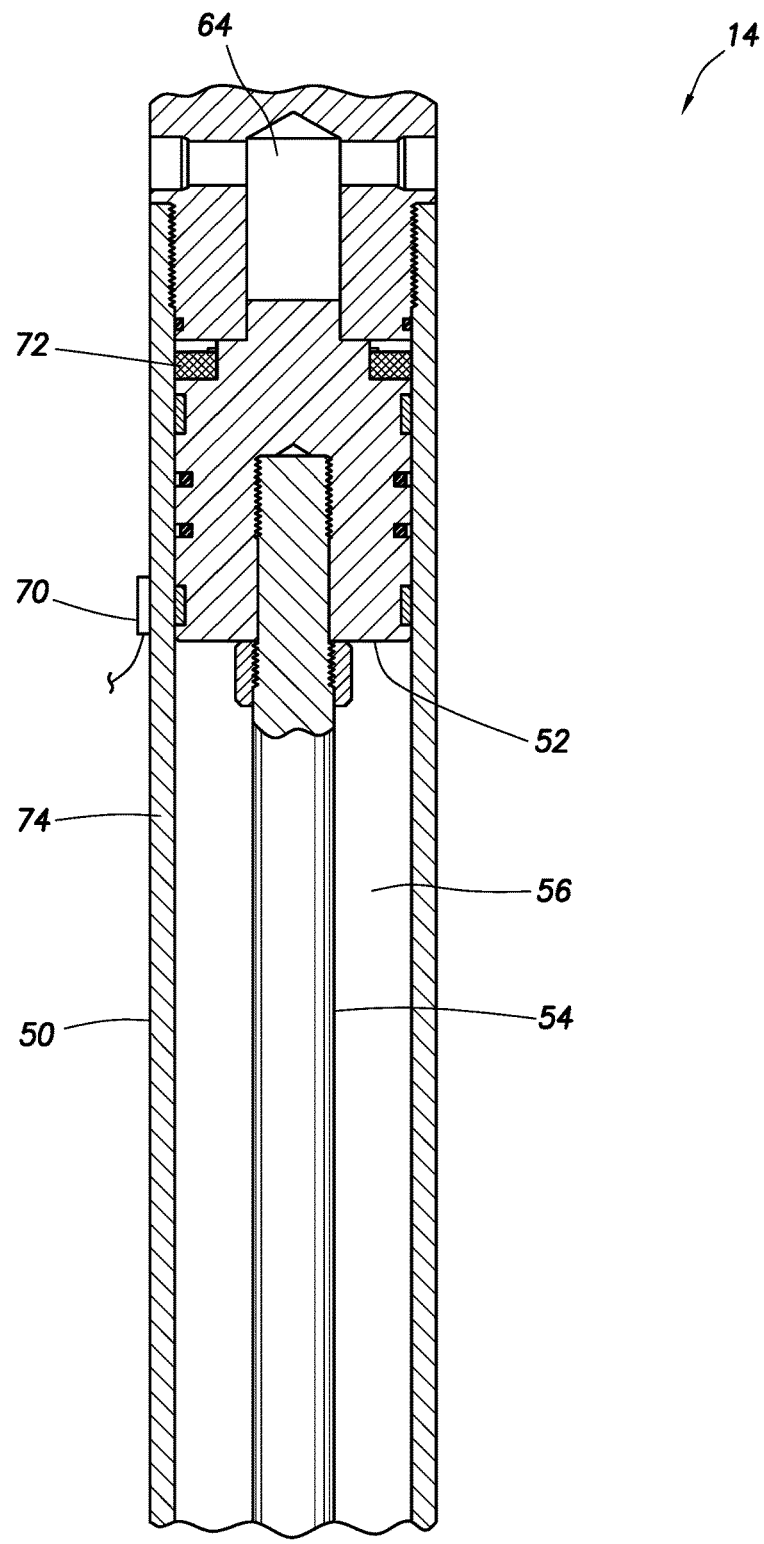
FIG. 3 is a representative partially cross-sectional view of a piston and cylinder portion of the hydraulic actuator.

Referring additionally now to FIG. 3, a further enlarged scale cross-sectional view of an upper portion of the hydraulic actuator 14 is representatively illustrated. This view is rotated somewhat about a vertical axis of the hydraulic actuator 14 (as compared to FIG. 2), so that a sensor 70, for example, a magnetic field sensor, is visible in FIG. 3.

The sensor 70 is secured to an outer surface of the cylinder 50 (for example, using a band clamp, not shown). In other examples, the sensor 70 could be bonded, threaded or otherwise attached to the cylinder 50, or could be incorporated into the cylinder or another component of the hydraulic actuator 14.

In some examples, a position of the sensor 70 relative to the cylinder 50 can be adjustable. The sensor 70 could be movable longitudinally along the cylinder 50, for example, via a threaded rod or another type of linear actuator.

A suitable magnetic field sensor is a Pepperl MB-F32-A2 magnetic flux sensing switch marketed by Pepperl+Fuchs North America of Twinsburg, Ohio USA. However, other magnetic field sensors may be used in keeping with the principles of this disclosure.

The sensor 70 (when a magnetic field sensor is used) is capable of sensing a presence of a magnet device 72 through a wall 74 of the cylinder 50. The magnet device 72 is secured to, and displaces with, the piston 52. In some examples, the sensor 70 can sense the presence of the magnet device 72, even though the wall 74 comprises a ferromagnetic material (such as steel), and even though the wall is relatively thick (such as, approximately 1.27 cm or greater thickness).

A suitable magnet for use in the magnet device 72 is a neodymium magnet (such as, a neodymium-iron-boron magnet) in ring form. However, other types and shapes of magnets may be used in keeping with the principles of this disclosure. The magnet device 72 may include multiple magnets or other components, as described more fully below.

Although only one sensor 70 is visible in FIG. 3, it is contemplated that any number of sensors could be used with the hydraulic actuator 14. The sensors 70 could be distributed in a variety of different manners relative to the cylinder 50 (e.g., linearly, helically, evenly spaced, unevenly spaced, etc.).

In the FIG. 3 example, an output of the sensor(s) 70 is communicated to the control system 46, so that a position of the piston 52 at any given point in the pumping operation is determinable. As the number of sensors 70 is increased, determination of the position of the piston 52 at any given point in the pumping operation can become more accurate.

For example, two of the sensors 70 could be positioned on the cylinder 50, with one sensor at a position corresponding to an upper stroke extent of the piston 52 and magnet device 72, and the other sensor at a position corresponding to a lower stroke extent of the piston and magnet. When a sensor 70 detects that the piston 52 and magnet device 72 have displaced to the corresponding stroke extent (by sensing the proximate presence of the magnet device 72), the control system 46 appropriately reverses the stroke direction of the piston 52 by operation of the hydraulic pressure source 12. In this example, the upper and lower stroke extents of the piston 52 can be conveniently varied by adjusting the longitudinal positions of the sensors 70 on the cylinder 50.

Figure 4:
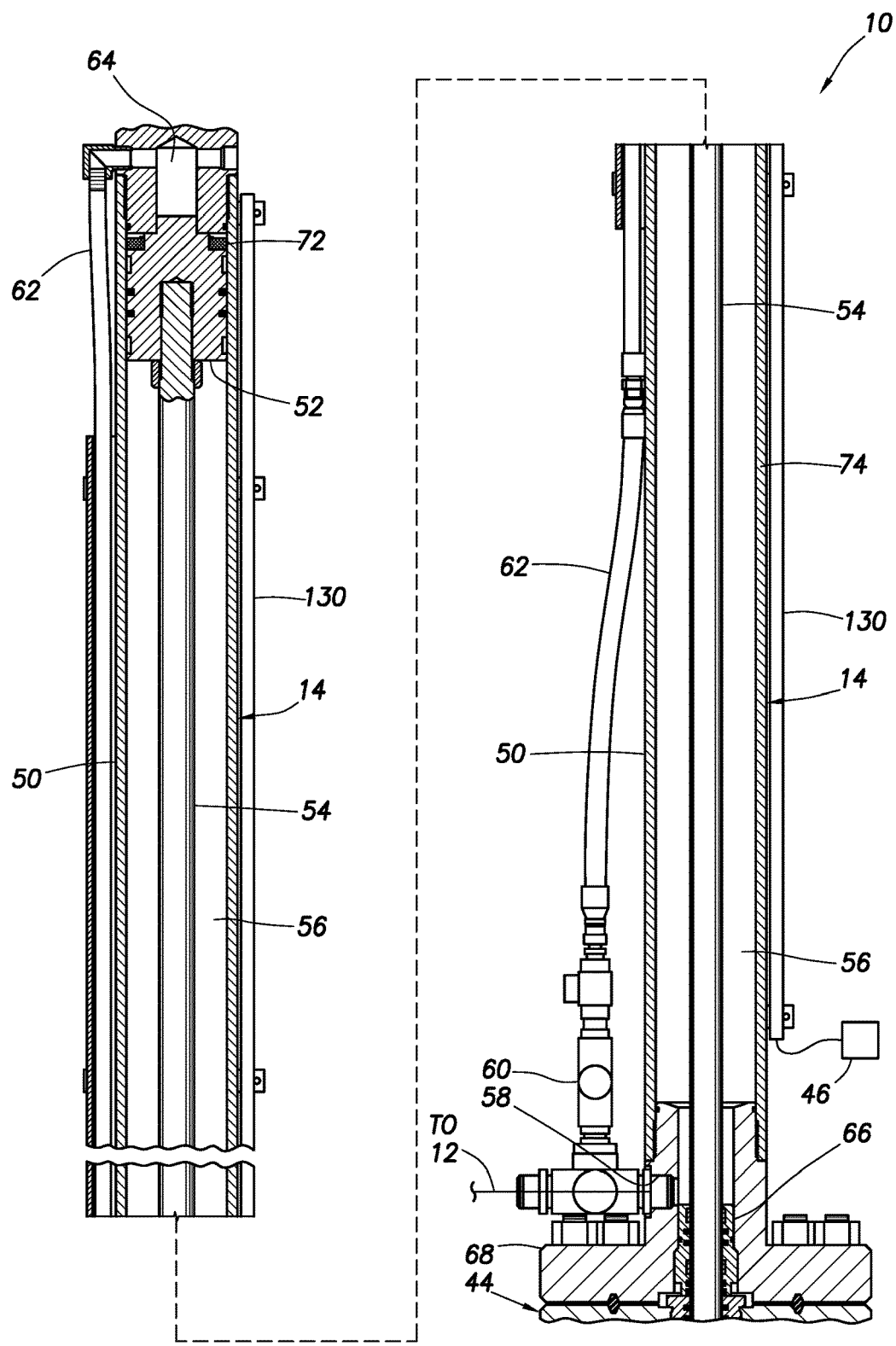
FIG. 4 is a representative partially cross-sectional view of another example of the hydraulic actuator as used in the hydraulic pumping system and method.

Referring additionally now to FIG. 4, another example of the hydraulic actuator 14 is representatively illustrated. In this example, a position of the piston 52 (and the rod string 18 connected thereto) can be continuously sensed, to thereby provide for more precise control over reciprocation of the piston 52 and rod string 18. More precise reciprocation control can provide for enhanced pumping efficiency, mitigation of pump-off and pump-pound conditions, and prevention of gas-lock.

In the FIG. 4 example, a position sensor 130 is used to continuously detect the position of the magnet device 72 and piston 52. For example, the position sensor 130 can comprise a linear transducer (or a linear variable displacement transducer). The position sensor 130 in this example can be a Hall effect sensor capable of continuously sensing the presence and position of the magnet device 72 on the piston 52 as it displaces to and between its upper and lower stroke extents.

As used herein, the term "continuous" is used to refer to a substantially uninterrupted sensing of position by the sensor 130. For example, when used to continuously detect the position of the piston 52, the sensor 130 can detect the piston's position during all portions of its reciprocating motion, and not just at certain discrete points (such as, at the upper and lower stroke extents). However, a continuous position sensor may have a particular resolution (e.g., 0.001-0.1 mm) at which it can detect the position of a member. Accordingly, the term "continuous" does not require an infinitely small resolution.

A suitable position sensor for use as the sensor 130 in the system 10 is available from Rota Engineering Ltd. of Manchester, United Kingdom. Other suitable position sensors are available from Hans Turck GmbH & Co. KG of Germany, and from Balluff GmbH of Germany. However, the scope of this disclosure is not limited to use of any particular sensor with the system 10.

As depicted in FIG. 4, the sensor 130 is attached externally to the cylinder 50, so that the sensor 130 extends longitudinally along the cylinder 50. In other examples, the sensor 130 could be otherwise located (such as, in the wall 74 of the cylinder 50, in the piston rod 54, etc.), or could be otherwise oriented (such as, extending helically on or in the cylinder 50, etc.). Thus, the scope of this disclosure is not limited to any particular location or orientation of the sensor 130.

An output of the sensor 130 can be communicated to the control system 46. In this manner, the control system 46 can be provided with an accurate measurement of the piston 52 position at any point in the piston's reciprocation, thereby dispensing with any need to perform calculations based on discrete detections of position (as with the sensors 70 of FIG. 3), detections/calculations of hydraulic fluid displacement, etc. It will be appreciated by those skilled in the art that actual continuous position detection can be more precise than such calculations of position, since various factors (including known and unknown factors, such as, temperature, fluid compressibility, fluid leakage, etc.) can affect the calculations.

The control system 46, provided with accurate continuous measurement of the piston's 52 position, can more precisely control operation of the hydraulic pressure source 12 (see FIG. 1) to achieve various objectives. For example, the control system 46 can operate the hydraulic pressure source 12 in a manner that prevents or mitigates gas-lock, optimizes work output, increases efficiency, reduces peak or average electrical power consumption, etc. However, note that the scope of this disclosure is not limited to accomplishment of any particular objective by communication of continuous position measurements to the control system 46.

Figure 5:
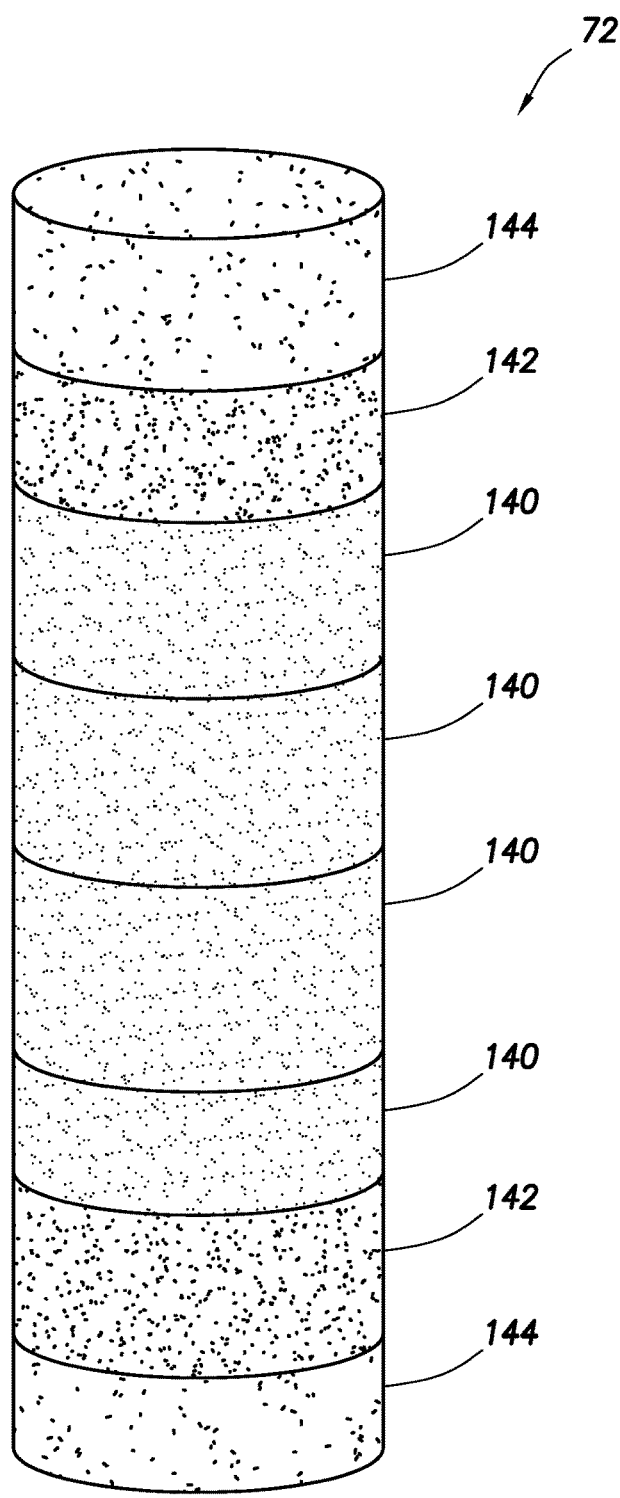
FIG. 5 is a representative perspective view of an example of a magnet device that may be used in the hydraulic actuator.

Referring additionally now to FIG. 5, an enlarged scale perspective view of an example of the magnet device 72 is representatively illustrated. In this example, magnets and other components of the magnet device 72 are depicted in disc form, but they could be in annular or ring-shaped form, or any other form or shape, in keeping with the principles of this disclosure.

In the FIG. 5 example, the magnet device 72 includes one or more permanent magnets 140 (such as, comprising Ne—Fe—B material), relatively high magnetic permeability elements 142 (such as, comprising SuperMuMag™ or "super mu metal" material) positioned on opposite sides of the magnets, and relatively low magnetic permeability elements 144 (such as, comprising a stainless steel material, for example, 300-series stainless steel).

The term "relatively high magnetic permeability" as used herein refers to materials having magnetic permeability of greater than $1\times10^{-4}$ H/m, or relative permeability greater than $100\mu/\mu o$, at a magnetic field strength of approximately 0.002 T. The term "relatively low magnetic permeability" as used herein refers to materials having magnetic permeability of less than $1\times10^{-5}$ H/m, or relative permeability less than $75\mu/\mu o$, at a magnetic field strength of approximately 0.002 T.

The relatively low magnetic permeability elements 144 serve to restrict magnetic flux emanating from the magnets 140 from propagating beyond the elements 144. The relatively high magnetic permeability elements 142 serve to direct propagation of the magnetic flux radially outward (e.g., into and through the surrounding cylinder wall 74). In this manner, the sensor 130 can more readily detect the presence of the magnet device 72.

Figure 6:
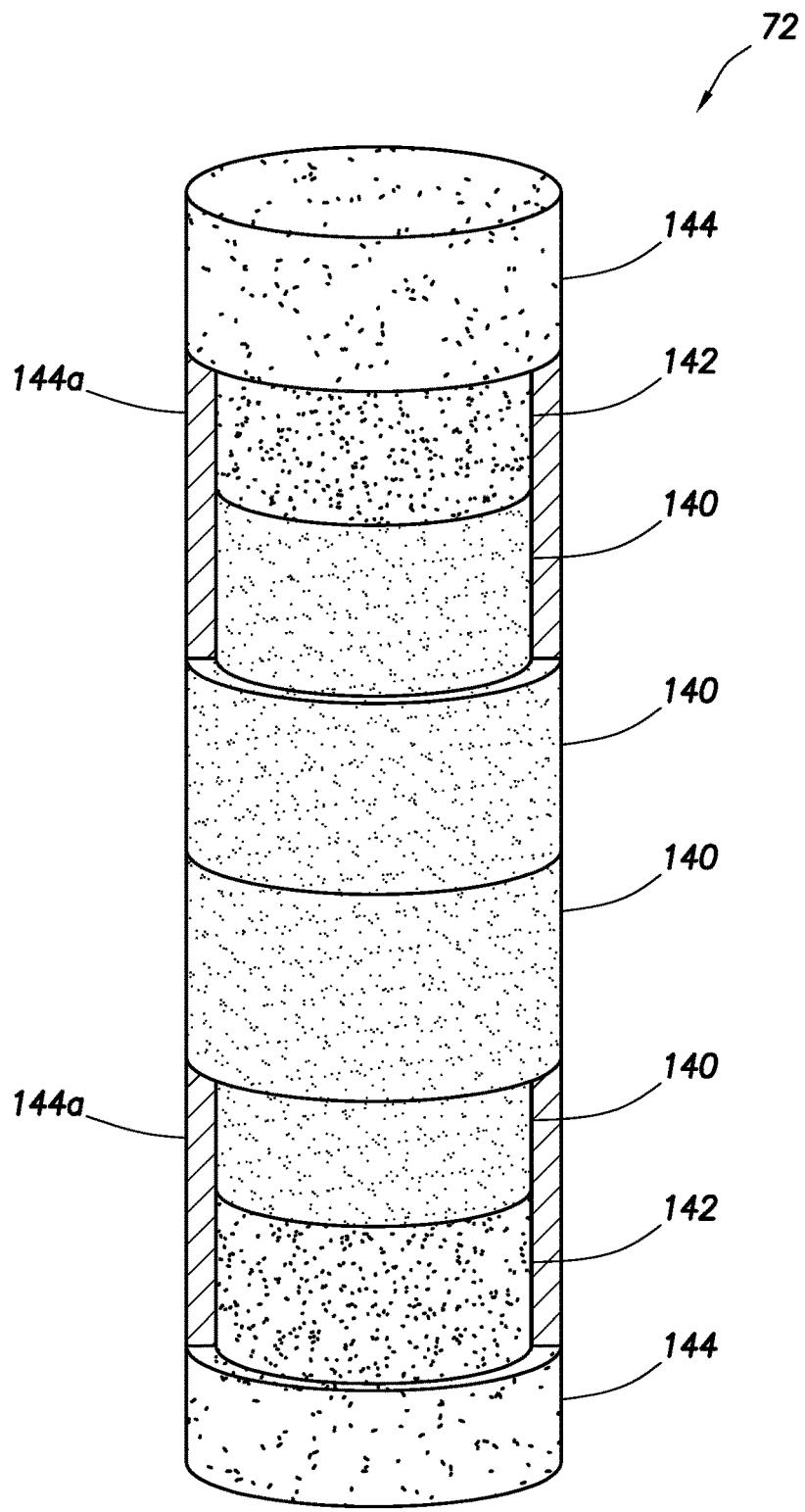
FIG. 6 is a representative partially cross-sectional view of another example of the magnet device.

Referring additionally now to FIG. 6, another example of the magnet device 72 is representatively illustrated. In this example, the relatively low magnetic permeability elements 144 each have a generally tubular extension 144a that extends about the adjacent high magnetic permeability elements 142 and the next adjacent magnets 140. Note that the extensions 144a may be integrally formed with the elements 144, or they may be separate elements.

The extensions 144a create a "lens" that limits an axial extent of the magnet device 72 where the magnetic flux can propagate radially outward from the magnets 140. This serves to increase the magnetic flux strength in this limited axial extent, thereby enabling the sensor 130 to more readily detect the presence of the magnet device 72.

Figure 7:
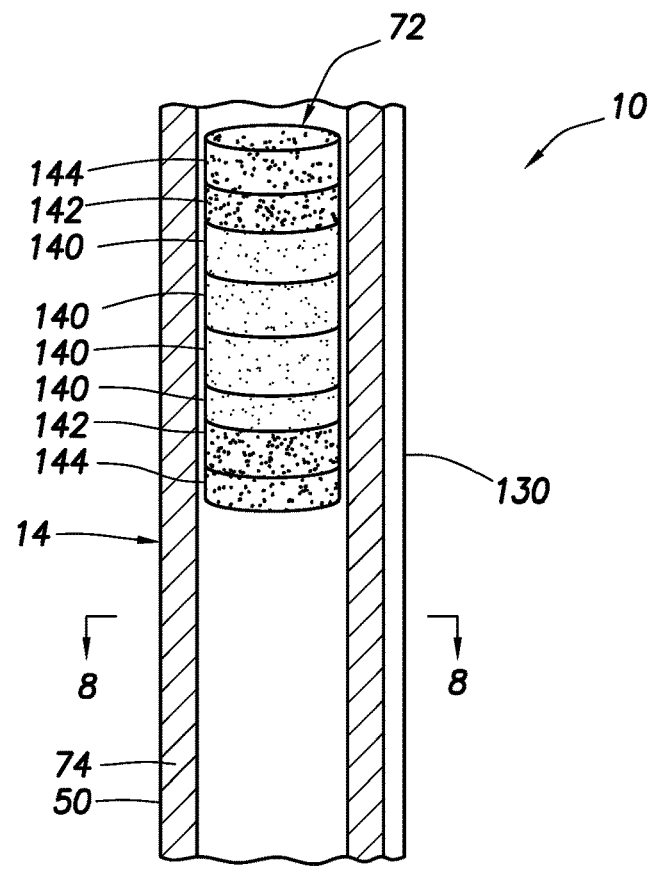
FIG. 7 is a representative partially cross-sectional view of another example of the hydraulic actuator including the FIG. 5 magnet device example.

Referring additionally now to FIG. 7, the magnet device 72 is representatively illustrated as received in the cylinder 50 of the actuator 14. The sensor 130 extends longitudinally along an exterior of the cylinder 50. The piston 52 and piston rod 54 are not depicted in FIG. 7, but as in the example of FIG. 4, the magnet device 72 can be attached to and displace with the piston. In other examples, the magnet device 72 could be attached to or displace with the piston rod 54 or another component of the actuator 14.

Figure 9:
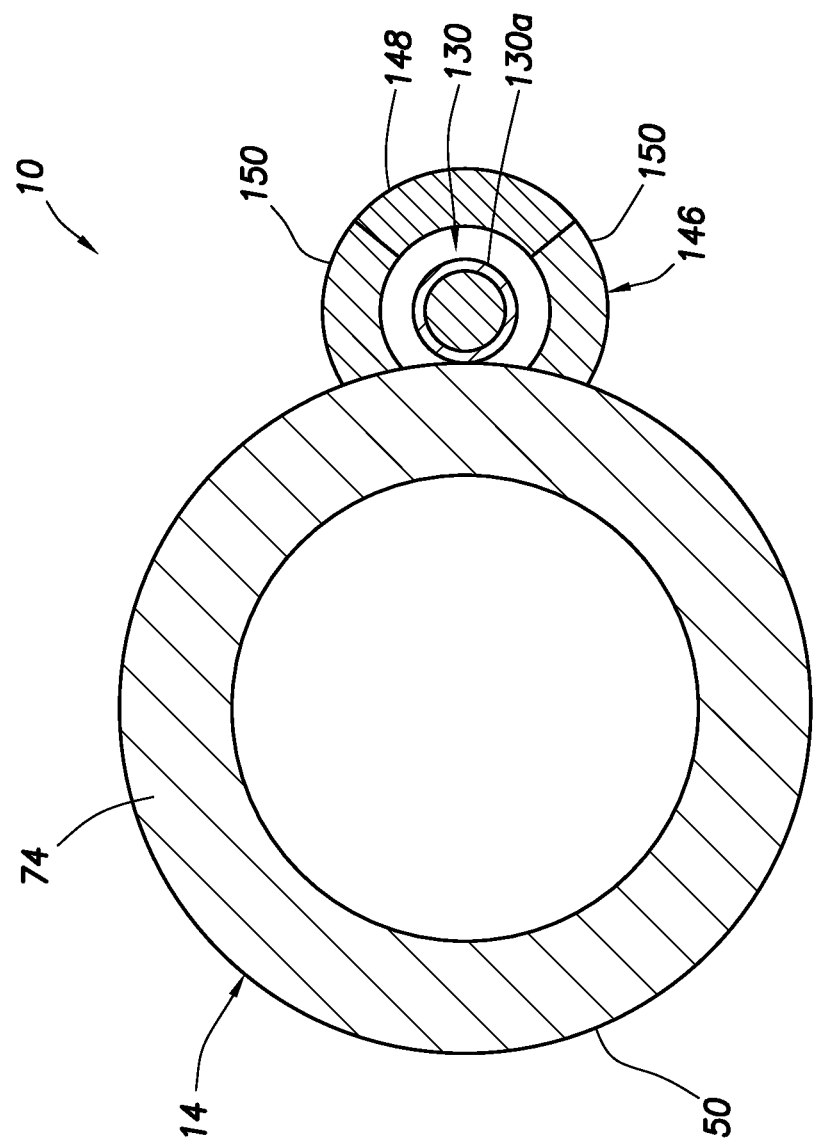
FIG. 9 is a representative cross-sectional view of another example of the hydraulic actuator.

The sensor 130 can comprise an outer tube 130a (such as, a 6.35 mm outer diameter tube, see FIG. 9). Preferably, in this example, the tube 130a comprises a material that is the same as, or substantially the same as, that of the cylinder 50 (such as, a ferrous material). However, other materials may be used in keeping with the principles of this disclosure.

Figure 8:
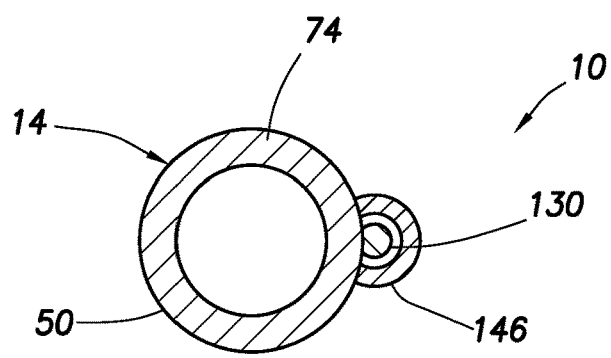
FIG. 8 is a representative cross-sectional view of the hydraulic actuator, taken along line 8-8 of FIG. 7.

Referring additionally now to FIG. 8, a cross-sectional view of the actuator 14 is representatively illustrated, taken along line 8-8 of FIG. 7. Again, the piston rod 54 is not depicted in FIG. 8.

In the FIG. 8 example, the sensor 130 is positioned within an enclosure 146 on the exterior of the cylinder 50. The enclosure 146 is, in this example, preferably made of the same material (or substantially the same material) as that of the cylinder 50 and the tube 130a of the sensor 130. In this manner, the magnetic flux that propagates through the cylinder wall 74 is also induced to propagate about the sensor 130 (e.g., via the material of the tube and enclosure 146), so that the sensor can more readily detect the presence of the magnet device 72.

Referring additionally now to FIG. 9, an enlarged scale cross-sectional view of another example of the actuator 14 is representatively illustrated. In this example, the enclosure 146 comprises multiple materials 148, 150 arranged in a manner that further enhances propagation of the magnetic flux about the sensor 130.

The material 148 is positioned so that the sensor 130 is between the material 148 and the cylinder wall 74. The material 148 comprises a relatively low magnetic permeability material, so that the magnetic flux is impeded from propagating through the material 148.

The material 150 is positioned on opposite lateral sides of the sensor 130. The material 150 comprises a relatively high magnetic permeability material, so that the magnetic flux is induced to propagate from the cylinder wall 74, through the sensor 130, and outward via the material 150. In this manner, the sensor 130 is exposed to increased magnetic flux density and can, thus, more readily detect the presence of the magnet device 72.

In the FIGS. 8 & 9 examples, a thickness of the enclosure 146 can be much less than the thickness of the cylinder wall 74. For example, the thickness of the enclosure 146 could be on the order of 0.13 cm, compared to the 1.27 cm thickness of the cylinder wall 74. This allows the sensor 130 to be positioned much closer to the magnetic flux it is detecting, resulting in significantly improved detection of the magnet device 72 by the sensor.

Note that, in some examples, the cylinder 50 may be constructed using a relatively low magnetic permeability material (such as, a 300-series stainless steel). In such examples, the enclosure 146 could advantageously comprise a relatively high magnetic permeability material 150 (such as, a ferrous material, a ferromagnetic material, steel, etc.). In this manner, the cylinder wall 74 can behave as a "window" that does not substantially affect the magnetic flux emanating from the magnet device 72. The magnetic flux will propagate through the cylinder wall 74 and be directed by the relatively high magnetic permeability material 150 of the enclosure 146 toward the sensor 130, thereby enhancing detection of the magnetic flux by the sensor.

It may now be fully appreciated that the above description provides significant advancements to the art of actuator member position sensing. In various examples described above, pumping of a fluid from a well can be made more efficient, convenient, economical and productive utilizing the hydraulic pumping system 10 and associated methods. These and other objectives can be accomplished with use of the improved magnet device 72 and sensors 70, 130 for position sensing.

Examples of an actuator 14 and an associated method are described above, in which a magnet device 72 displaces with a member (such as, the piston 52 or piston rod 54) of the actuator. A presence and position of the magnet device 72 is detected by a sensor 70, 130, and the magnet device is configured to enhance or concentrate propagation of a magnetic flux to the sensor.

The magnet device 72 may include at least one magnet 140 positioned between elements 142. Each of the elements 142 can comprise a relatively high magnetic permeability material.

The magnet device 72 may further include additional elements 144, with each of the additional elements 144 being positioned opposite the magnet 140 from one of the elements 142. Each of the additional elements 144 can comprise a relatively low magnetic permeability material.

The relatively low magnetic permeability material may extend about one or more of the elements 142. The relatively low magnetic permeability material may also, or alternatively, extend about one or more magnets 140.

An actuator 14 and associated method are also described above, in which a magnet device 72 displaces with a member (such as, the piston 52 or piston rod 54) of the actuator, a presence and position of the magnet device is detected by a sensor 70, 130, and the actuator is configured to enhance or concentrate propagation of a magnetic flux to the sensor.

The sensor 130 may comprise an outer tube 130a comprising the same, or substantially the same, material as a cylinder 50 of the actuator 14. The sensor 130 may be positioned in an enclosure 146 on an exterior of a cylinder 50 of the actuator 14. The enclosure 146 may comprise the same, or substantially the same, material as the cylinder 50 of the actuator 14.

The enclosure 146 may comprise a relatively low magnetic permeability material 148. In this example, the sensor 130 may be positioned between the relatively low magnetic permeability material 148 and a wall 74 of the cylinder 50.

The enclosure 146 may comprise a relatively high magnetic permeability material 150. The relatively high magnetic permeability material 150 may be positioned on opposite lateral sides of the sensor 130.

The relatively high magnetic permeability material 150 may be positioned in the enclosure 146 structure between the wall 74 of the cylinder 50 and the relatively low magnetic permeability material 148.

In some examples, the magnetic flux emanates substantially uniformly radially outward from the magnet device 72, but the materials 148, 150 are positioned appropriately exterior to the cylinder 50 of the actuator 14, so that the magnetic flux density is increased at a location of the sensor 130 on the cylinder. The materials 148, 150 may be included in an enclosure 146 for the sensor 130, or they may be included in another structure associated with the sensor.

An example of a hydraulic pumping system 10 for use with a subterranean well can comprise an actuator 14 including a displaceable actuator member (such as, the piston 52 or piston rod 54), a magnet device 72 that displaces with the actuator member, the magnet device 72 comprising one or more permanent magnet 140 positioned between low magnetic permeability elements 144, and a sensor 130 that senses a magnetic flux propagated from the magnet device 72.

The magnet device 72 may also include high magnetic permeability elements 142, with the high magnetic permeability elements 142 being positioned between the low magnetic permeability elements 144. Each of the high magnetic permeability elements 142 may be positioned between the one or more permanent magnet 140 and a respective one of the low magnetic permeability elements 144.

A relatively low magnetic permeability material 144a may extend around the high magnetic permeability elements 142. The one or more permanent magnet 140 may comprise multiple permanent magnets 140, and a relatively low magnetic permeability material 144a may extend around at least one of the permanent magnets 140. A relatively low magnetic permeability material 144a may extends around at least a portion of one permanent magnet 140.

The hydraulic pumping system may also include a downhole pump 20 connected to the actuator 14.

The actuator 14 can include a cylinder 50 in which the actuator member 52, 54 displaces, and may further include an enclosure 146 positioned exterior to the cylinder 50, with the sensor 130 being positioned at least partially in the enclosure 146.

The enclosure 146 may comprise a relatively low magnetic permeability material 148, with the sensor 130 being positioned between the relatively low magnetic permeability material 148 and a wall 74 of the cylinder 50. The enclosure 146 may further comprise a relatively high magnetic permeability material 150, with the relatively high magnetic permeability material 150 being positioned between the relatively low magnetic permeability material 148 and the wall 74 of the cylinder 50.

Another example of a hydraulic pumping system 10 for use with a subterranean well can comprise an actuator 14 including a cylinder 50, and an actuator member 52, 54 that displaces at least partially in the cylinder 50, the cylinder comprising a first material, a magnet device 72 that displaces with the actuator member 52, 54, and a sensor 130 that senses a magnetic flux propagated from the magnet device 72, the sensor 130 including an outer tube 130a, and the outer tube comprising a second material.

The first and second materials can have substantially a same magnetic permeability. The magnetic permeability of the first and second materials may be a relatively high magnetic permeability.

Another example of a hydraulic pumping system 10 for use with a subterranean well can comprise an actuator 14 including a cylinder 50, and an actuator member 52, 54 that displaces at least partially in the cylinder 50, a magnet device 72 that displaces with the actuator member 52, 54, a sensor 130 that senses a magnetic flux propagated from the magnet device 72, and an enclosure 146 positioned exterior to the cylinder 50, the sensor 130 being positioned at least partially in the enclosure 146.

The sensor 130 may be positioned laterally between two relatively high magnetic permeability materials 150 of the enclosure 146. The enclosure 146 may also comprise a relatively low magnetic permeability material 148 positioned between the relatively high magnetic permeability materials 150.

Although each example described above includes a certain combination of features, it should be understood that it is not necessary for all features of an example to be used. Instead, any of the features described above can be used, without any other particular feature or features also being used.

It should be understood that the various embodiments described herein may be utilized in various orientations, such as inclined, inverted, horizontal, vertical, etc., and in various configurations, without departing from the principles of this disclosure. The embodiments are described merely as examples of useful applications of the principles of the disclosure, which is not limited to any specific details of these embodiments.

In the above description of the representative examples, directional terms (such as "above," "below," "upper," "lower," etc.) are used for convenience in referring to the accompanying drawings. However, it should be clearly understood that the scope of this disclosure is not limited to any particular directions described herein.

The terms "including," "includes," "comprising," "comprises," and similar terms are used in a non-limiting sense in this specification. For example, if a system, method, apparatus, device, etc., is described as "including" a certain feature or element, the system, method, apparatus, device, etc., can include that feature or element, and can also include other features or elements. Similarly, the term "comprises" is considered to mean "comprises, but is not limited to."

Of course, a person skilled in the art would, upon a careful consideration of the above description of representative embodiments of the disclosure, readily appreciate that many modifications, additions, substitutions, deletions, and other changes may be made to the specific embodiments, and such changes are contemplated by the principles of this disclosure. For example, structures disclosed as being separately formed can, in other examples, be integrally formed and vice versa. Accordingly, the foregoing detailed description is to be clearly understood as being given by way of illustration and example only, the spirit and scope of the invention being limited solely by the appended claims and their equivalents.

What is claimed is:

1. A hydraulic pumping system for use with a subterranean well, the hydraulic pumping system comprising:
    an actuator including a displaceable actuator member;
    a magnet device that displaces with the actuator member, the magnet device comprising at least one permanent magnet positioned between low magnetic permeability elements;
    a sensor that senses a magnetic flux propagated from the magnet device;
    a cylinder in which the actuator member displaces; and
    an enclosure positioned exterior to the cylinder, the sensor being positioned at least partially in the enclosure,
    the enclosure comprising a first relatively low magnetic permeability material, in which the sensor is positioned between the first relatively low magnetic permeability material and a wall of the cylinder, and
    the enclosure further comprising a relatively high magnetic permeability material, in which the relatively high magnetic permeability material is positioned between the first relatively low magnetic permeability material and the wall of the cylinder.

2. The hydraulic pumping system of claim 1, in which the magnet device further comprises high magnetic permeability elements, and in which the high magnetic permeability elements are positioned between the low magnetic permeability elements.

3. The hydraulic pumping system of claim 2, in which each of the high magnetic permeability elements is positioned between the at least one permanent magnet and a respective one of the low magnetic permeability elements.

4. The hydraulic pumping system of claim 2, in which a second relatively low magnetic permeability material extends around the high magnetic permeability elements.

5. The hydraulic pumping system of claim 2, in which the at least one permanent magnet comprises multiple permanent magnets, and in which a second relatively low magnetic permeability material extends around at least one of the permanent magnets.

6. The hydraulic pumping system of claim 1, in which a second relatively low magnetic permeability material extends around at least a portion of the at least one permanent magnet.

7. The hydraulic pumping system of claim 1, further comprising a downhole pump connected to the actuator.

8. A hydraulic pumping system for use with a subterranean well, the hydraulic pumping system comprising:
    an actuator including a cylinder, and an actuator member that displaces at least partially in the cylinder;
    a magnet device that displaces with the actuator member;
    a sensor that senses a magnetic flux propagated from the magnet device; and
    an enclosure positioned exterior to the cylinder, the sensor being positioned at least partially in the enclosure,
    the enclosure comprising a relatively low magnetic permeability material, in which the sensor is positioned between the relatively low magnetic permeability material and a wall of the cylinder, and the enclosure further comprising a relatively high magnetic permeability material, in which the relatively high magnetic permeability material is positioned between the relatively low magnetic permeability material and the wall of the cylinder.

9. A hydraulic pumping system for use with a subterranean well, the hydraulic pumping system comprising:

an actuator including a cylinder, and an actuator member that displaces at least partially in the cylinder;

a magnet device that displaces with the actuator member;

a sensor that senses a magnetic flux propagated from the magnet device; and an enclosure positioned exterior to the cylinder, the sensor being positioned at least partially in the enclosure, in which the sensor is positioned laterally between two relatively high magnetic permeability materials of the enclosure, and in which the enclosure comprises a relatively low magnetic permeability material positioned between the relatively high magnetic permeability materials.

* * * * *